(12) United States Patent
Xiao

(10) Patent No.: US 11,270,208 B2
(45) Date of Patent: Mar. 8, 2022

(54) NEURAL NETWORK BATCH NORMALIZATION OPTIMIZATION METHOD AND APPARATUS

(71) Applicant: Shenzhen Intellifusion Technologies Co., Ltd., Guangdong (CN)

(72) Inventor: Haiyong Xiao, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/257,314

(22) PCT Filed: Nov. 28, 2019

(86) PCT No.: PCT/CN2019/121522
§ 371 (c)(1),
(2) Date: Dec. 31, 2020

(87) PCT Pub. No.: WO2020/134829
PCT Pub. Date: Jul. 2, 2020

(65) Prior Publication Data
US 2021/0182685 A1    Jun. 17, 2021

(30) Foreign Application Priority Data
Dec. 25, 2018   (CN) .......................... 201811590504.8

(51) Int. Cl.
*G06N 3/08*   (2006.01)
*G06N 3/04*   (2006.01)

(52) U.S. Cl.
CPC ........... *G06N 3/082* (2013.01); *G06N 3/0481* (2013.01)

(58) Field of Classification Search
CPC ............................ G06N 3/082; G06N 3/0481
(Continued)

(56) References Cited

U.S. PATENT DOCUMENTS 5,422,981 A * 6/1995 Niki ..................... G06K 9/66
382/159
2018/0285715 A1* 10/2018 Son .......................... G06N 3/08
(Continued)

FOREIGN PATENT DOCUMENTS

CN    108734268 A    11/2018

OTHER PUBLICATIONS

Arpit, et al., "Normalization Propagation: A Parametric Technique for Removing Internal Covariate Shift in Deep Networks", Proceedings of the 33rd International Conference on Machine Learning, New York, NY, USA 2016 (Year: 2016).*

*Primary Examiner* — Tsu-Chang Lee

(57) ABSTRACT

A neural network batch normalization optimization method includes: setting a first network layer in a neural network as a starting layer; sequentially obtaining initial bias values of different network layers backwards starting from the starting layer; calculating equivalent bias values of the different network layers; determining whether there is a target network layer, wherein a ratio of the equivalent bias value corresponding to a previous layer of a target network layer to the equivalent bias value corresponding to the target network layer is no less than a pre-set threshold value; and if the target network layer is present, setting the bias values of the different network layers between the starting layer and the previous layer of the target network layer to zero, and taking the equivalent bias value of the target network layer as a bias value of the target network layer.

12 Claims, 3 Drawing Sheets

(58) Field of Classification Search
USPC ............................................................ 706/12
See application file for complete search history.

(56) References Cited

U.S. PATENT DOCUMENTS

2020/0160125 A1* 5/2020 Wang ........................ G06N 3/04
2020/0218964 A1* 7/2020 Nakahara ................. G06N 3/08

* cited by examiner

NEURAL NETWORK BATCH NORMALIZATION OPTIMIZATION METHOD AND APPARATUS

1. CROSS-REFERENCE TO RELATED APPLICATION

This application claims priority to Chinese Patent Application No. 201811590504.8, entitled "NEURAL NETWORK BATCH NORMALIZATION OPTIMIZATION METHOD AND APPARATUS" and filed on Dec. 25, 2018, the content of which is hereby incorporated by reference in its entirety.

2. TECHNICAL FIELD

The present disclosure generally relates to neural network technology field, and especially relates to a neural network batch normalization optimization method and an apparatus.

3. DESCRIPTION OF RELATED ART

In recent years, with the development of deep learning technology, deep neural network has become a key technology of artificial intelligence. Batch Normalization (Batch Norm) is a method that can speed up a deep network training process, however, the Batch Normalization process is required artificial introduction of bias, in a subsequent network processing process, if the artificial bias is not eliminated in time, it can be gradually amplified. If the artificial bias is too large, it will lead to difficulty of network fixed-point realization. If output data of each layer of the network is quantified directly, a lot of bit width is wasted on invalid data bias, and the data that is really needed real bit quantization after it is eliminated the bias can only obtain left low quantization bit, which causes fixed-point bit widths of the network to be expanded.

SUMMARY

The technical problems to be solved: in view of the shortcomings of the related art, the present disclosure relates to a neural network batch normalization optimization method and an apparatus which can reduce influence of artificially introduced bias and effectively reduce demands of fixed-point widths of the network.

In a first respect, a neural network batch normalization optimization method according to an embodiment of the present disclosure includes:

setting a first network layer in neural network as an initial layer;

starting from the initial layer, successively obtaining initial bias values of the plurality of different network layers from front to back;

processing the initial bias values of the different network layers separately by invoking a preset algorithm to obtain equivalent bias values of the different network layers;

determining whether there is a target network layer, and a ratio between an equivalent bias value corresponding to a previous layer of the target network layer and an equivalent bias value corresponding to the target network layer is not less than a preset threshold; and if there is a target network layer, setting bias values of different network layers between the initial layer and the previous layer of the target network layer to zero, and taking the equivalent bias value of the target network layer as a bias value of the target network layer.

Optionally, determining that the target network layer is not located at the last layer of the neural network, then setting a latter layer of the target network layer as the initial layer, and performing the steps of starting from the initial layer, successively obtaining initial bias values of the plurality of different network layers from front to back, and processing the initial bias values of the different network layers separately by invoking a preset algorithm to obtain equivalent bias values of the different network layers.

In a second respect, a neural network batch normalization optimization apparatus according to an embodiment of the present disclosure includes:

a start layer setup module configured to set a first network layer in neural network as an initial layer;

an initial bias value acquisition module configured to obtain sequentially initial bias values of different network layers backwards starting from the initial layer;

a data processing module configured to process the initial bias values of the different network layers separately by invoking a preset algorithm to obtain equivalent bias values of the different network layers;

a judging module configured to determine whether there is a target network layer, and a ratio between an equivalent bias value corresponding to a previous layer of the target network layer and an equivalent bias value corresponding to the target network layer is not less than a preset threshold; and an optimization processing module configured to set bias values of different network layers between the initial layer and the previous layer of the target network layer to zero, and take the equivalent bias value of the target network layer as a bias value of the target network layer.

In a third respect, a terminal according to an embodiment of the present disclosure includes a processor, an input device, an output device and a memory. The processor, the input device, the output device and the memory are interconnected. The memory is configured to store computer programs, the computer programs include program instructions, and the processor is configured to invoke the program instructions to perform step instructions which are described in the first aspect.

In a fourth respect, a computer readable storage medium according to an embodiment of the present disclosure is configured to store computer programs for electronic data interchange, the computer programs performed by a computer to implement some or all steps of the neural network batch normalization optimization method in the first aspect.

In a fifth respect, a computer product according to an embodiment of the present disclosure includes a non-instantaneous computer readable storage medium that stores computer programs therein, the computer program performed by a computer to implement some or all steps of the neural network batch normalization optimization method in the first aspect. The computer product can be a software installation package.

The present disclosure provides the advantages as below.

It can be seen that, in an embodiment of the present disclosure, the neural network batch normalization optimization apparatus is configured to, process an initial bias value of each network layer to obtain an equivalent bias value of the each network layer, by obtaining the target network layer, wherein a ratio between an equivalent bias value corresponding to a previous layer of the target network layer and an equivalent bias value corresponding to the target network layer is not less than a preset threshold, so as to determine the equivalent bias value of the target network layer is a smaller equivalent bias value within a certain range. Setting a bias value of each network layer between the initial layer and the previous layer of the target network layer to zero, and taking the equivalent bias value of the target network layer as the bias value of the target network layer to ensure that a bias value of a non-target network layer is zero; the bias value of the target network layer is very small so that bias values of different network layers in a final neural network are very small. Therefore, the present disclosure can solve a problem that the high information bits are wasted when artificial bias is too large in the neural network with Batch Normalization. The present disclosure can effectively reduce bit widths after the network is fixed-point, which is conducive to the network deployment on various artificial intelligence (AI) hardware platforms with limited bit widths.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Figure 1:
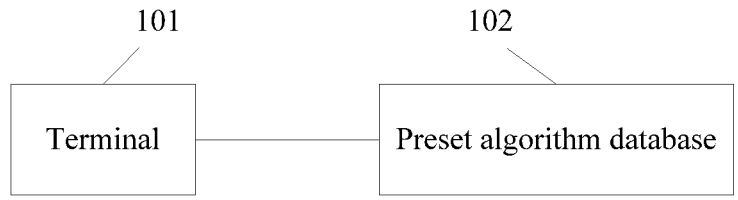
FIG. 1 is an interaction diagram of a neural network batch normalization optimization apparatus in accordance with an embodiment of the present disclosure.

FIG. 1 illustrates an interaction diagram of a neural network batch normalization optimization apparatus in accordance with an embodiment of the present disclosure. Referring to FIG. 1, the interaction includes a terminal 101 and a preset algorithm database 102. The terminal 101 is configured to set a first network layer in neural network as an initial layer, and involve a preset algorithm from the preset algorithm database 102 to calculate equivalent bias (bias) values of different network layers from the initial layer; the terminal 101 is further configured to determine whether there is a target network layer, wherein, a ratio between an equivalent bias value corresponding to a previous layer of the target network layer and an equivalent bias value corresponding to the target network layer is not less than a preset threshold. If the target network layer is existed, the terminal 101 is further configured to set bias values of different network layers between the starting layer and the previous layer of the target network layer to zero, and take the equivalent bias value of the target network layer as a bias value of the target network layer. If the target network layer isn't existed, then initial bias values of each network layer can't be processed. If not, the terminal 101 is configured to set a latter layer of the target network layer as the initial layer and invoke the preset algorithm from the preset algorithm database 102 to calculate the equivalent bias values of the different network layers from the initial layer; if yes, the terminal 101 is configured to terminate optimization operation of the neural network batch normalization.

It can be seen that, in an embodiment of the present disclosure, the neural network batch normalization optimization apparatus is configured to, process an initial bias value of each network layer to obtain an equivalent bias value of the each network layer, by obtaining the target network layer, wherein a ratio between an equivalent bias value corresponding to a previous layer of the target network layer and an equivalent bias value corresponding to the target network layer is not less than a preset threshold, so as to determine the equivalent bias value of the target network layer is a smaller equivalent bias value within a certain range. Setting a bias value of each network layer between the initial layer and the previous layer of the target network layer to zero, and taking the equivalent bias value of the target network layer as the bias value of the target network layer to ensure that a bias value of a non-target network layer is zero; the bias value of the target network layer is very small so that bias values of different network layers in a final neural network are very small. Therefore, the present disclosure can solve a problem that the high information bits are wasted when artificial bias is too large in the neural network with Batch Normalization. The present disclosure can effectively reduce bit widths after the network is fixed-point, which is conducive to the network deployment on various artificial intelligence (AI) hardware platforms with limited bit widths.

Figure 2:
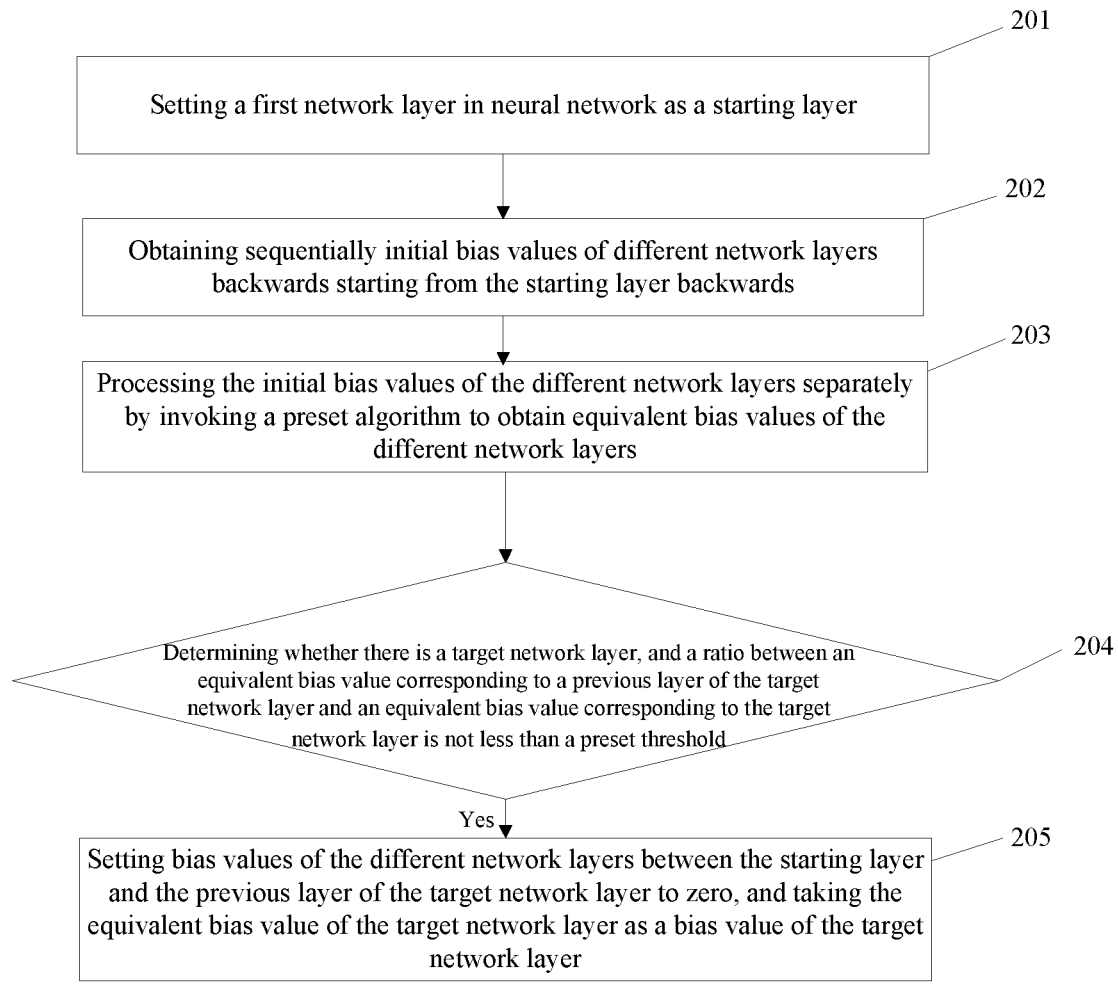
FIG. 2 is a flowchart of a neural network batch normalization optimization method in accordance with an embodiment of the present disclosure.

FIG. 2 illustrates a flowchart of a neural network batch normalization optimization method in accordance with an embodiment of the present disclosure. Referring to FIG. 2, the method includes steps 201-205, specifically as follows:

step 201, setting a first network layer in neural network as an initial layer;

step 202, starting from the initial layer, successively obtaining initial bias values of the plurality of different network layers from front to back;

furthermore, the initial bias value is referred to a bias value obtained by machine training and learning in the neural network, which is used as the initial bias value before optimization;

step 203, processing the initial bias values of the different network layers separately by invoking a preset algorithm to obtain equivalent bias values of the different network layers;

optionally, an equivalent bias value of the first network layer of the initial layer is the initial bias value of the first network layer; an equivalent bias value of a second network layer is calculated that a sum is obtained by multiplying the initial bias value of the initial layer by weights of the second network layer, and then an initial bias value of the second network layer is added, that is, the equivalent bias value of the second network layer can be obtained. An equivalent bias value of an N-th network layer is calculated that a sum is obtained by multiplying a (N−1)-th equivalent bias value of the (N−1)-th network layer by weights of the N-th network layer, and then an initial bias value of the N-th network layer is added, that is, the equivalent bias value of the N-th network layer can be obtained.

step 204, determining whether there is a target network layer, and a ratio between an equivalent bias value corresponding to a previous layer of the target network layer and an equivalent bias value corresponding to the target network layer is not less than a preset threshold;

furthermore, the preset threshold can be 100, 1000 or several thousand, if the preset threshold is 100, the equivalent bias value corresponding to the target network layer is 3.5, the equivalent bias value corresponding to a previous layer of the target network layer is 2000. So, 2000 divided by 3.5 is equal to 571.43, and 571.43 is not less than the preset threshold.

step 205, if there is a target network layer, setting bias values of different network layers between the initial layer and the previous layer of the target network layer to zero, and taking the equivalent bias value of the target network layer as a bias value of the target network layer.

When there is the target network layer, setting bias values of the different network layers between the initial layer and the previous layer of the target network layer to zero, and taking the equivalent bias value of the target network layer as the bias value of the target network layer. That is, by optimizing the bias value of the network layer corresponding to the equivalent bias value that is satisfied conditions to a corresponding equivalent bias value, optimizing the bias value of each network layer between the initial layer and the previous layer of the target network layer to zero, so that the bias value of the different network layers between the initial layer and the previous layer of the target network layer of the final neural network is smaller, which can solve a problem that high-level information bits are wasted, when artificially introduced bias is too large in the neural network with batch normalization.

Furthermore, the method further includes: determining that the target network layer is not located at the last layer of the neural network, setting a latter layer of the target network layer as the starting layer; and performing steps of obtaining equivalent bias values of the different activation layers between the starting layer and the target network layer, and processing the initial bias values of the different network layers separately by invoking the preset algorithm to obtain equivalent bias values of the different network layers.

It can be seen that, in an embodiment of the present disclosure, the neural network batch normalization optimization apparatus is configured to, process an initial bias value of each network layer to obtain an equivalent bias value of the each network layer, by obtaining the target network layer, wherein a ratio between an equivalent bias value corresponding to a previous layer of the target network layer and an equivalent bias value corresponding to the target network layer is not less than a preset threshold, so as to determine the equivalent bias value of the target network layer is a smaller equivalent bias value within a certain range. Setting a bias value of each network layer between the initial layer and the previous layer of the target network layer to zero, and taking the equivalent bias value of the target network layer as the bias value of the target network layer to ensure that a bias value of a non-target network layer is zero; the bias value of the target network layer is very small so that bias values of different network layers in a final neural network are very small. Therefore, the present disclosure can solve a problem that the high information bits are wasted when artificial bias is too large in the neural network with Batch Normalization. The present disclosure can effectively reduce bit widths after the network is fixed-point, which is conducive to the network deployment on various artificial intelligence (AI) hardware platforms with limited bit widths.

Based on the embodiment of the present disclosure, for the same initial layer, when there are N target network layers, in order to determine a suitable equivalent bias value, that is, the target network layer, then:

obtaining a minimum equivalent bias value in the equivalent bias values respectively corresponding to the N target network layers; determining the network layer corresponding to the minimum equivalent bias value as an optimized target network layer.

That is, by determining the network layer corresponding to the minimum equivalent bias value as the target network layer, the bias value of each network layer preceding the target network layer is zero, so that the bias value of the different network layers of the final neural network is smaller, which can solve a problem that the high information bits are wasted when artificial bias is too large in the neural network with batch normalization.

Alternatively, when there are N target network layers, determining the last network layer in the N target network layers as the target network layer.

By determining the network layer corresponding to the equivalent bias value located at the back as the target network layer, Compared with choosing the network layer located at the front as the target network layer, when the previous network layer is selected as the target network layer, a latter layer of a current target network layer is taken as the initial layer during circularly obtaining the target network layer, obtaining the equivalent bias values of the latter layer of the target network layer and subsequent layers in turn, and obtaining a ratio of the equivalent bias values of adjacent before and after layers between the latter layer of the target network layer and each of the subsequent layers. Therefore, it is comparative that the network layer corresponding to the equivalent bias value at the back is selected as the target network layer to a certain extent, which can reduce calculation amount of the optimization method when selecting the target network layer, and improve efficiency of optimization processing.

Figure 3:
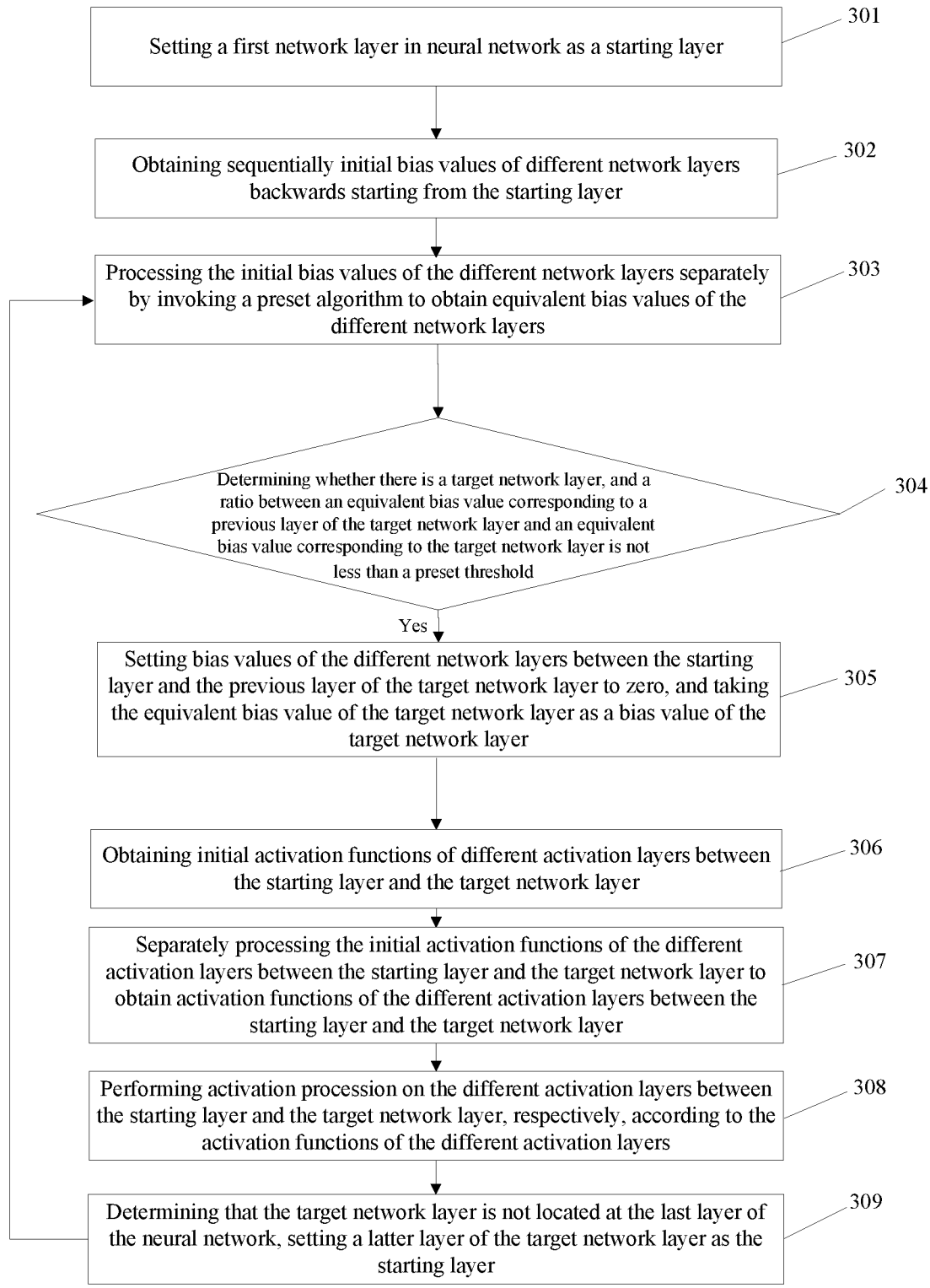
FIG. 3 is a flowchart of a neural network batch normalization optimization method in accordance with another embodiment of the present disclosure.

FIG. 3 illustrates a flowchart of a neural network batch normalization optimization method in accordance with another embodiment of the present disclosure. When the bias of the network layer is changed, an activation operation of an activation layer is needed to be modified accordingly. That is, activation functions of different activation layers are needed to be modified accordingly, otherwise, if the bias of the network layer is not added, errors are caused when still setting zero according to data less than zero. As shown in FIG. 3, the method can include steps 301-309, specifically as follows:

step 301, setting a first network layer in neural network as an initial layer;

step 302, starting from the initial layer, successively obtaining initial bias values of the plurality of different network layers from front to back;

step 303, processing the initial bias values of the different network layers separately by invoking a preset algorithm to obtain equivalent bias values of the different network layers;

step 304, determining whether there is a target network layer, and a ratio between an equivalent bias value corresponding to a previous layer of the target network layer and an equivalent bias value corresponding to the target network layer is not less than a preset threshold;

step 305, if there is a target network layer, setting bias values of different network layers between the initial layer and the previous layer of the target network layer to zero, and taking the equivalent bias value of the target network layer as a bias value of the target network layer;

if the target network layer isn't existed, the initial bias values of all network layers from the initial layer backwards aren't changed at all, and are processed according to a batch normalization process of the normal neural network.

step 306, obtaining initial activation functions of different activation layers between the initial layer and the target network layer;

step 307, separately processing the initial activation functions of the different activation layers between the initial layer and the target network layer to obtain activation functions of the different activation layers between the initial layer and the target network layer;

by obtaining the equivalent bias values of the different activation layers between the initial layer and the target network layer; according to the equivalent bias values of the different activation layers, separately processing the initial activation functions of the different activation layers to obtain the activation functions of the different activation layers between the initial layer and the target network layer;

wherein, the normal activation operation is performed using the following activation function:

$$relu(x) = \begin{cases} x & x \geq 0; \\ 0 & x < 0; \end{cases}$$

optimizing the above activation function, then the optimized activation function is as follows:

relu(x+bias_eq)=relu_new(x)+bias_eq;

$$relu\_new(x) = \begin{cases} x & x \geq -bias\_eq; \\ -bias\_eq & x < -bias\_eq; \end{cases}$$

wherein, x is an input value of the activation function of the different activation layers before being adjusted, bias_eq is equivalent biases of the different activation layers, and relu_new (x) is the modified activation function.

step 308, respectively performing activation procession on the different activation layers between the initial layer and the target network layer according to the activation functions of the different activation layers;

step 309, determining that the target network layer is not located at the last layer of the neural network, setting a latter layer of the target network layer as the initial layer; and performing steps of obtaining equivalent bias values of the different activation layers between the initial layer and the target network layer, and processing the initial bias values of the different network layers separately by invoking the preset algorithm to obtain equivalent bias values of the different network layers.

By the embodiment of the present disclosure, processing the initial bias value of each network layer to obtain the target network layer, setting bias values of the each network layer preceding the target network layer to zero, and taking the equivalent bias value of the target network layer as the bias value of the target network layer. In this way, the activation function of the activation layer can be modified to ensure a normal operation of the activation layer when the bias value is modified accordingly.

Furthermore, based on the embodiments of the present disclosure, the method further includes:

confirming there is an A-th network layer existed between the initial layer and the target network layer, and there is an initial padding value of the A-th network layer, wherein, A is an integer and is not less than 1;

processing the initial padding value of the A-th network layer to obtain a padding value of the A-th network layer.

By obtaining an equivalent bias value of the A-th network layer, according to the equivalent bias value of the A-th network layer, processing the initial padding value of the A-th network layer;

wherein, padding_new(y)=y_-bias_eq, y is the initial padding value of the different network layers before being optimized, correspondingly adjusting different padding values of layers in the neural network having the initial padding value by the algorithm.

By the embodiment of the present disclosure, after the bias value of each network layer is optimized, the padding values of the different network layers are adjusted by a specific algorithm respectively, so that the optimization of the neural network can ensure normalization of other parameters of the neural network.

Furthermore, before optimizing the bias values of the each network layer, the method further includes:

obtaining P batch normalization layers in the neural network, wherein P is a positive integer;

confirming there are P' batch normalization layers in the P batch normalization layers, wherein, a previous network layer of each of the P' batch normalization layers is a convolutional layer/full connection layer, 1≤P'≤P;

merging each of the P' batch normalization layers with a previous network layer corresponding to each of the P' batch normalization layers, respectively.

That is, before performing optimization procession on the bias value, merging the P' batch normalization layers that is satisfied conditions with their corresponding previous network layers, as a result, the number of layers of the neural network is reduced, and corresponding computation is reduced when calculating the equivalent bias value of each network layer and searching the target network layer, so as to improve processing efficiency.

As a specific embodiment of the scheme, a Batch Norm layer in the neural network is operated as follows:

A k-th layer is the Batch Norm layer and includes a plurality of outputs. An i-th output of the k-th Batch Norm layer can be expressed as follows:

$$out_k[i, :, :] = \frac{data_k[i, :, :] - data\_mean_k[i]}{\sqrt{data\_var_k[i] + \varepsilon}} * gamma_k[i] + beta_k[i] \quad (1)$$

$$data\_mean_k[i] = \text{mean}(data_k[i, :, :])$$

$$data\_var_k[i] = \text{var}(data_k[i, :, :])$$

wherein, $data_k[i, :, :]$ is input data of the k-th layer, $gamma_k[i]$ and $beta_k[i]$ are parameters of the i-th path of the k-th network layer obtained by training, $data\_var_k[i]$ is a variance of the i-th path of the k-th network layer obtained by training, $data\_mean_k[i]$ is a mean difference of the i-th path of the k-th network layer obtained by training, $\varepsilon$ is a constant;

by continuing to perform expansion and merge procession on the formula (1), it can be obtained that an expression of the i-th output of the k-th network layer can be simplified as follows:

$$out_k[i, :, :] = \frac{gamma_k[i]}{\sqrt{data\_var_k[i] + \varepsilon}} * data_k[i, :, :] - \quad (2)$$

-continued $$\frac{data\_mean_k[i]}{\sqrt{data\_var_k[i]+\varepsilon}} * gamma_k[i] + beta_k[i] =$$

$$weight_k[i] * data_k[i,:,:] + bias_k[i]$$

$$weight_k[i] = \frac{gamma_k[i]}{\sqrt{data\_var_k[i]+\varepsilon}};$$

defining:

$$bias_k[i] = -\frac{data\_mean_k[i]}{\sqrt{data\_var_k[i]+\varepsilon}} * gamma_k[i] + beta_k[i];$$

wherein, $weight_k[i]$ is represented a weight of the i-th path of the k-th network layer, $bias_k[i]$ is represented the bias value of the i-th path of the k-th network layer before being merged;

in order to reduce computation, the formula (2) can usually be processed during deployment of the neural network and merged into a (k−1)-th network layer, wherein the (k−1)-th network layer is a convolutional layer or a full connection layer, namely:

$$out_k[i,:,:] = weight_k[i] * data_k[i,:,:] + bias_k[i] = \quad (3)$$
$$weight_k[i] * (weight_{k-1}[i] \otimes data_{k-1} + bias_{k-1}[i]) + bias_k[i] =$$
$$(weight_k[i] * weight_{k-1}[i]) \otimes data_{k-1} +$$
$$(weight_k[i] * bias_{k-1}[i] + bias_k[i]) =$$
$$weight\_new_{k-1}[i] \otimes data_{k-1} + bias\_new_{k-1}[i]$$

wherein, $weight\_new_{k-1}[i] = weight_k[i] * weight_{k-1}[i]$; $bias\_new_{k-1}[i] = weight_k[i] * bias_{k-1}[i] + bias_k[i]$; $bias\_new_{k-1}[i]$ is represented the initial bias value of the i-th path of the (k−1)-th network layer by being merged according to the above formula (3), $weight\_new_{k-1}[i]$ is represented a transformed weight of the i-th path of the (k−1)-th network layer. That is, the output of the k-th layer can be represented by the (k−1)-th layer, and $weight\_new_{k-1}$ and $bias\_new_{k-1}$ is used by the (k−1)-th layer as a coefficient and a bias.

merging the batch normalization layer with a previous convolutional layer or a previous full connection layer corresponding to the batch normalization layer, as a result, the number of layers of the neural network is reduced, and corresponding computation is reduced when calculating the equivalent bias value of each network layer and searching the target network layer, so as to improve processing efficiency.

Then the equivalent bias value of each network layer after being merged is calculated as follows:

wherein, the k-th network layer is a convolutional layer or a full connection layer, the k-th network layer includes a plurality of branches, and an equivalent bias is adopted to the following formulas to transmission and superposition backwards:

$$bias\_eq_k[i] = bias\_new_k[i] + sum(weight\_new_{k-1}[i]) * bias\_eq_{k-1}; \quad (4)$$

$$bias\_eq_{k+1}[i] = bias\_new_{k+1}[i] + sum(weight\_new_k[i]) * bias\_eq_k; \quad (5)$$

wherein, $bias\_eq_k[i]$ is an equivalent bias value of the i-th path of the k-th network layer.

After the equivalent bias value of each layer is calculated, if a ratio between an equivalent bias value corresponding to a previous layer of a certain network layer and an equivalent bias value corresponding to the network layer is not less than a preset threshold; setting all bias values from the starting layer to the previous layer of the network layer to zero at this network layer, and taking the equivalent bias value of the network layer as a bias value of the network layer. By setting the bias value of each layer preceding this layer to zero, fixed-point data before this layer is mainly used to encode variable and abundant valid data, which can greatly reduce bit widths of the network.

Using the above process, during modifying the bias value, because there are generally nonlinear activation operations in the network, it is necessary to modify the activation operations accordingly. Otherwise, if the bias of the network layer is not added, errors are caused when still setting zero according to data less than zero.

The normal activation operation is performed according to the formula below:

$$relu(x) = \begin{cases} x & x \geq 0; \\ 0 & x < 0; \end{cases}$$

modifying the above activation operation, then the modified activation is as follows:

$$relu(x + bias\_eq) = relu\_new(x) + bias\_eq;$$

$$relu\_new(x) = \begin{cases} x & x \geq -bias\_eq; \\ -bias\_eq & x < -bias\_eq; \end{cases}$$

wherein, x is an input value of the activation operation of the different activation layers before being adjusted, $bias\_eq$ is equivalent biases of the different activation layers, and $relu\_new(x)$ is a modified activation function.

Furthermore, on the condition of padding being presented in the network, a padding value is needed to be modified accordingly. A modification way is similar to the activation operation. If the padding is zero, the padding value is needed to be changed to $-bias\_eq$. Normally, if the padding value is v, then the padding value after being modified is $V-bias\_eq$.

By performing activation operation on the different network layers, and adjusting padding values of layers that include the padding values by a specific algorithm, so that the optimization of the neural network can ensure normalization of other parameters of the neural network.

Figure 4:
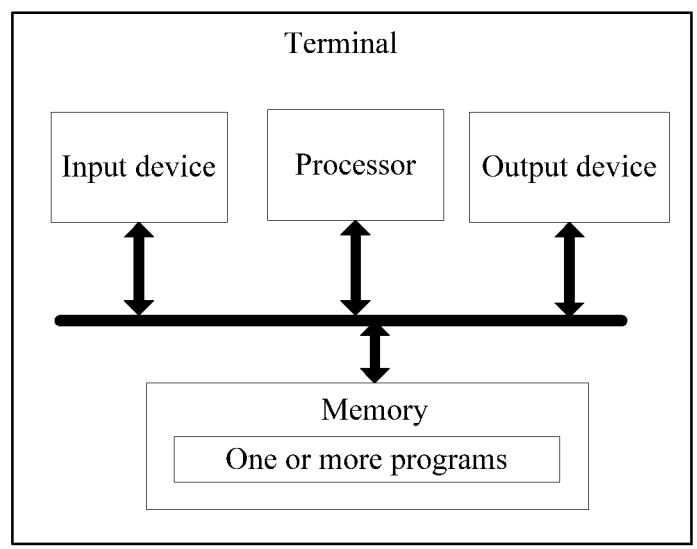
FIG. 4 is a schematic diagram of a terminal in accordance with an embodiment of the present disclosure.

Consistent with the above embodiments, FIG. 4 illustrates a schematic diagram of a terminal in accordance with an embodiment of the present disclosure. The terminal includes a processor, an input device, an output device and a memory. Each of the processor, the input device, the output device is connected with the memory. The memory is configured to store computer programs, the computer programs include program instructions, the processor is configured to invoke the program instructions to perform the following steps:

setting a first network layer in neural network as an initial layer;

starting from the initial layer, successively obtaining initial bias values of the plurality of different network layers from front to back;

processing the initial bias values of the different network layers separately by invoking a preset algorithm to obtain equivalent bias values of the different network layers;

determining whether there is a target network layer, and a ratio between an equivalent bias value corresponding to a previous layer of the target network layer and an equivalent bias value corresponding to the target network layer is not less than a preset threshold;

if there is a target network layer, setting bias values of different network layers between the starting layer and the previous layer of the target network layer to zero, and taking the equivalent bias value of the target network layer as a bias value of the target network layer;

determining that the target network layer is not located at the last layer of the neural network, setting a latter layer of the target network layer as the initial layer; and performing steps of obtaining equivalent bias values of the different activation layers between the initial layer and the target network layer, and processing the initial bias values of the different network layers separately by invoking the preset algorithm to obtain equivalent bias values of the different network layers.

It can be seen that, in an embodiment of the present disclosure, the neural network batch normalization optimization apparatus is configured to, process an initial bias value of each network layer to obtain an equivalent bias value of the each network layer, by obtaining the target network layer, wherein a ratio between an equivalent bias value corresponding to a previous layer of the target network layer and an equivalent bias value corresponding to the target network layer is not less than a preset threshold, so as to determine the equivalent bias value of the target network layer is a smaller equivalent bias value within a certain range. Setting a bias value of each network layer between the initial layer and the previous layer of the target network layer to zero, and taking the equivalent bias value of the target network layer as the bias value of the target network layer to ensure that a bias value of a non-target network layer is zero; the bias value of the target network layer is very small so that bias values of different network layers in a final neural network are very small. Therefore, the present disclosure can solve a problem that the high information bits are wasted when artificial bias is too large in the neural network with Batch Normalization. The present disclosure can effectively reduce bit widths after the network is fixed-point, which is conducive to the network deployment on various artificial intelligence (AI) hardware platforms with limited bit widths.

The scheme of the embodiment of the present disclosure is introduced mainly from a perspective of a method-side execution process. It is understandable that the terminal, in order to achieve the above functions, is configured to include corresponding hardware structure and/or software modules to perform each function. One of ordinary skill in the related art should be readily aware that the present disclosure can be implemented in a form of hardware or a combination of hardware and computer software, combined with units and algorithm steps of each example described in the embodiments provided in the present disclosure. Whether a function is implemented in a way of hardware or computer software driving hardware depends on a specific application of the technical scheme and design constraints. Technical professionals can use different methods for each particular application to implement described functions, but such implementation should not be considered to fall outside the protection scope of the present disclosure.

The embodiment of the present disclosure can divide functional units of the terminal according to examples of the method shown above. For example, functional units can be divided according to each function, or two or more functions can be integrated in a single processing unit. The integrated unit can be realized either in a form of hardware or in a form of software functional units. It should be noted that divisions of units in embodiments of the present disclosure is schematic, which is only a logical function division, so that it can be divided by other division methods in actual implementations.

Figure 5:
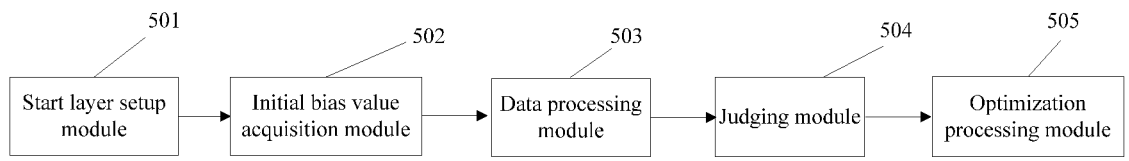
FIG. 5 is a schematic diagram of a neural network batch normalization optimization apparatus in accordance with an embodiment of the present disclosure.

Consistent with the above, FIG. 5 illustrates a schematic diagram of a neural network batch normalization optimization apparatus in accordance with an embodiment of the present disclosure. The apparatus includes a start layer setup module 501, an initial bias value acquisition module 502, a data processing module 503, a judging module 504 and an optimization processing module 505, wherein:

the start layer setup module 501 configured to set a first network layer in neural network as an initial layer;

initial bias value acquisition module 502 configured to obtain sequentially initial bias values of different network layers backwards starting from the initial layer;

the data processing module 503 configured to process the initial bias values of the different network layers separately by invoking a preset algorithm to obtain equivalent bias values of the different network layers;

the judging module 504 configured to determine whether there is a target network layer, and a ratio between an equivalent bias value corresponding to a previous layer of the target network layer and an equivalent bias value corresponding to the target network layer is not less than a preset threshold; and the optimization processing module 505 configured to set bias values of different network layers between the initial layer and the previous layer of the target network layer to zero, and take the equivalent bias value of the target network layer as a bias value of the target network layer.

Furthermore, the apparatus further includes an activation function processing module configured to:

obtain initial activation functions of different activation layers between the initial layer and the target network layer; obtain equivalent bias values of the different activation layers between the initial layer and the target network layer; according to the equivalent bias values of the different activation layers, separately process the initial activation functions of the different activation layers to obtain activation functions of the different activation layers between the initial layer and the target network layer; and respectively perform activation procession on the different activation layers between the initial layer and the target network layer according to the activation functions of the different activation layers.

Furthermore, the apparatus further includes a padding processing module configured to:

confirm there is an A-th network layer between the initial layer and the target network layer, and there is an initial padding value of the A-th network layer, wherein, A is an integer and is not less than 1; process an initial padding value of the A-th network layer to obtain a padding value of the A-th network layer.

Furthermore, the apparatus further includes a merge processing module configured to:

obtain P batch normalization layers in the neural network, wherein P is a positive integer; confirm there are P' batch normalization layers in the P batch normalization layers, and merge each of the P' batch normalization layers with a previous network layer corresponding to each of the P' batch normalization layers, respectively; wherein, the previous network layer of the each of the P' batch normalization layers is a convolutional layer/full connection layer, $1 \leq P' \leq P$.

Furthermore, the apparatus further includes a target network layer determination module configured to:

when there are N target network layers, obtain a minimum equivalent bias value in the equivalent bias values respectively corresponding to the N target network layers, determine the network layer corresponding to the minimum equivalent bias value as the target network layer; wherein N is an integer greater than 1;

or when there are N target network layers, determine the last network layer in the N target network layers as the target network layer.

It can be seen that, in an embodiment of the present disclosure, the neural network batch normalization optimization apparatus is configured to, process an initial bias value of each network layer to obtain an equivalent bias value of the each network layer, by obtaining the target network layer, wherein a ratio between an equivalent bias value corresponding to a previous layer of the target network layer and an equivalent bias value corresponding to the target network layer is not less than a preset threshold, so as to determine the equivalent bias value of the target network layer is a smaller equivalent bias value within a certain range. Setting a bias value of each network layer between the initial layer and the previous layer of the target network layer to zero, and taking the equivalent bias value of the target network layer as the bias value of the target network layer to ensure that a bias value of a non-target network layer is zero; the bias value of the target network layer is very small so that bias values of different network layers in a final neural network are very small. Therefore, the present disclosure can solve a problem that the high information bits are wasted when artificial bias is too large in the neural network with Batch Normalization. The present disclosure can effectively reduce bit widths after the network is fixed-point, which is conducive to the network deployment on various artificial intelligence (AI) hardware platforms with limited bit widths.

A computer readable storage medium according to an embodiment of the present disclosure is provided. The computer readable storage medium is configured to store computer programs for electronic data interchange performed by a computer to implement part or all of the steps of any neural network batch normalization optimization method which is described in embodiments of the present disclosure.

A computer program product according to an embodiment of the present disclosure includes a non-transient computer readable storage medium. The non-transient computer readable storage medium is configured to store computer programs performed by a computer to implement part or all of the steps of any neural network batch normalization optimization method which is described in embodiments of the present disclosure.

It should be noted that, for the sake of simple description, each embodiment of the above method is expressed as a series of action combinations, however, for one of ordinary skill in the related art, the present disclosure can't be restricted by its sequence of the description, as some steps can be simultaneously performed or in other orders according to the present disclosure. Furthermore, it can be understood, for one of ordinary skill in the related art, that embodiments or examples in the description is alternative exemplary embodiments or examples, and actions and modules involved are not necessarily required for the present disclosure.

In the above embodiments, the description of each embodiment has its own emphasis, and parts without detailed description in one embodiment can be referred to relevant description of other embodiments.

In some exemplary embodiments of the present disclosure, it can be understood that the disclosed devices can be implemented via other ways. For example, the device of the embodiment described above is only a schematic description, for example, the partition of the units is only a logical function partition, which can be implemented via another way, for example, a plurality of units or components can be combined or integrated into another system, or some features can be ignored or not implemented. On the other hand, coupling or direct coupling or communication connection between them shown or discussed can be indirect coupling or communication connection through some interfaces, devices or units, which can be electrical ways or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

In addition, the functional units in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

The integrated units can be stored in a computer readable memory if implemented in the form of software program modules and sold or used as a separate product. Based on this understanding, the technical scheme of the present disclosure is essentially or part of the contribution to the related art or all or part of the technical scheme implemented as the form of software products, such computer software product can be stored in a memory and includes a plurality of instructions performed, by a computer device (which can be a personal computer, a server, a network device, etc) to implement all or part of steps of the method described in each embodiment of the present disclosure. The aforementioned memory includes: U disks, ROMs (Read-Only memories), RAMs (Random Access memories), hard disks, disks or CDs, and other mediums for storing program codes.

It is obvious to one of ordinary skill in the related art that all or part of the steps in the various methods of the above embodiments can be implemented by program instructions of relevant hardware which can be stored in a computer readable memory, and the memory can include flash disks, Read-Only Memories (ROMs), Random Access Memories (RAMs), disks, or CDs.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A neural network batch normalization optimization method applied to a terminal, the terminal comprising a processor, an input device, an output device and a memory, each of the processor, the input device, the output device electrically connected with the memory, wherein computerized programs are stored in the memory and comprising program instructions, a plurality of different network layers is comprised in a neural network, and the program instructions are executed by the processor to perform the neural network batch normalization optimization method, the method comprising:

Setting, using the processor, a first network layer in the neural network as an initial layer;

starting from the initial layer, successively obtaining, using the processor, initial bias values of the plurality of different network layers from front to back;

processing, using the processor, the initial bias values of the plurality of different network layers separately by invoking a preset algorithm to obtain equivalent bias values of the plurality of different network layers;

determining, using the processor, whether there is a target network layer, and a ratio between an equivalent bias value corresponding to a previous layer of the target network layer and an equivalent bias value corresponding to the target network layer is not less than a preset threshold; and if the target network layer existed, setting bias values of the plurality of different network layers between the initial layer and the previous layer of the target network layer to zero, and taking, using the processor, the equivalent bias value of the target network layer as a bias value of the target network layer; and wherein the equivalent bias value of the first network layer is the initial bias value of the first network layer; the equivalent bias value of an N-th network layer that is behind an (N−1)-th network layer, is calculated that a sum is obtained by multiplying the (N−1)-th equivalent bias value of the (N−1)-th network layer by weights of the N-th network layer, and the initial bias value of the N-th network layer is added to obtain the equivalent bias value of the N-th network layer;

wherein N is an integer equal to or more than two.

2. The neural network batch normalization optimization method as claimed in claim 1, wherein the method further comprises:

obtaining, using the processor, initial activation functions of a plurality of different activation layers formed between the initial layer and the target network layer;

obtaining, using the processor, equivalent bias values of the plurality of different activation layers formed between the initial layer and the target network layer;

according to the equivalent bias values of the plurality of different activation layers, separately processing, using the processor, the initial activation functions of the plurality of different activation layers to obtain activation functions of the plurality of different activation layers between the initial layer and the target network layer; and performing, using the processor, activation procession on the plurality of different activation layers between the initial layer and the target network layer, respectively, according to the activation functions of the different activation layers.

3. The neural network batch normalization optimization method as claimed in claim 2, wherein after performing activation procession on the plurality of different activation layers formed between the initial layer and the target network layer, respectively, according to the activation functions of the plurality of different activation layers, the method further comprises:

confirming, using the processor, there is an A-th network layer existed between the initial layer and the target network layer, and there is an initial padding value of the A-th network layer, wherein, A is an integer and is not less than 1;

obtaining, using the processor, an equivalent bias value of the A-th network layer;

according to the equivalent bias value of the A-th network layer, processing, using the processor, the initial padding value of the A-th network layer to obtain a padding value of the A-th network layer.

4. The neural network batch normalization optimization method as claimed in claim 1, wherein before setting the first network layer in the neural network as the initial layer, the method further comprises:

obtaining, using the processor, P batch normalization layers in the neural network, wherein P is a positive integer;

confirming, using the processor, there are P' batch normalization layers in the P batch normalization layers, wherein, a previous network layer of each of the P' batch normalization layers is a convolutional layer/full connection layer, 1≤P'≤P; and merging, using the processor, each of the P' batch normalization layers with a previous network layer corresponding to each of the P' batch normalization layers.

5. The neural network batch normalization optimization method as claimed in claim 4, wherein the method further comprises:

when there are N target network layers, obtaining, using the processor, a minimum equivalent bias value in the equivalent bias values corresponding to the N target network layers, wherein N is an integer greater than 1;

determining, using the processor, the network layer corresponding to the minimum equivalent bias value as the target network layer;

or when there are N target network layers, determining, using the processor, the last network layer in the N target network layers as the target network layer.

6. A neural network batch normalization optimization apparatus applied to a terminal, the terminal comprising a processor, an input device, an output device and a memory, each of the processor, the input device, the output device electrically connected with the memory, wherein computerized programs are stored in the memory and comprising program instructions, a plurality of different network layers is comprised in a neural network, and the program instructions are executed by the processor, the apparatus comprising:

a start layer setup module performed by the processor and configured to set a first network layer in the neural network as an initial layer;

starting from the initial layer, an initial bias value acquisition module performed by the processor and configured to successively obtain initial bias values of the plurality of different network layers from front to back;

a data processing module performed by the processor and configured to process the initial bias values of the plurality of different network layers separately by invoking a preset algorithm to obtain equivalent bias values of the plurality of different network layers;

a judging module performed by the processor and configured to determine whether there is a target network layer, and a ratio between an equivalent bias value corresponding to a previous layer of the target network layer and an equivalent bias value corresponding to the target network layer is not less than a preset threshold; and an optimization processing module configured to set bias values of the plurality of different network layers between the initial layer and the previous layer of the target network layer to zero, and take the equivalent bias value of the target network layer as a bias value of the target network layer; and wherein the equivalent bias value of the first network layer is the initial bias value of the first network layer; the equivalent bias value of an N-th network layer that is behind an (N−1)-th network layer, is calculated that a sum is obtained by multiplying the (N−1)-th equivalent bias value of the (N−1)-th network layer by weights of the N-th network layer, and the initial bias value of the N-th network layer is added to obtain the equivalent bias value of the N-th network layer;

wherein N is an integer equal to or more than two.

7. The neural network batch normalization optimization apparatus as claimed in claim 6, wherein the apparatus further comprises an activation function processing module performed by the processor and configured to:

obtain initial activation functions of a plurality of different activation layers formed between the initial layer and the target network layer;

obtain equivalent bias values of the plurality of different activation layers formed between the initial layer and the target network layer;

according to the equivalent bias values of the plurality of different activation layers, separately process the initial activation functions of the plurality of different activation layers to obtain activation functions of the plurality of different activation layers between the initial layer and the target network layer; and perform activation procession on the plurality of different activation layers between the initial layer and the target network layer, respectively, according to the activation functions of the different activation layers.

8. The neural network batch normalization optimization apparatus as claimed in claim 7, wherein the apparatus further comprises a padding processing module performed by the processor and configured to:

confirm there is an A-th network layer between the initial layer and the target network layer, and there is an initial padding value of the A-th network layer, wherein, A is an integer and is not less than 1;

obtain an equivalent bias value of the A-th network layer;

according to the equivalent bias value of the A-th network layer, process the initial padding value of the A-th network layer to obtain a padding value of the A-th network layer.

9. The neural network batch normalization optimization apparatus as claimed in claim 8, wherein the apparatus further comprises a merge processing module performed by the processor and configured to:

obtain P batch normalization layers in the neural network, wherein P is a positive integer;

confirm there are P' batch normalization layers in the P batch normalization layers, wherein, a previous network layer of each of the P' batch normalization layers is a convolutional layer/full connection layer, 1≤P'≤P; and merge each of the P' batch normalization layers with a previous network layer corresponding to each of the P' batch normalization layers, respectively.

10. The neural network batch normalization optimization apparatus as claimed in claim 9, wherein the apparatus further comprises a target network layer determination module performed by the processor and configured to:

when there are N target network layers, obtain a minimum equivalent bias value in the equivalent bias values corresponding to the N target network layers, wherein N is an integer greater than 1;

determine the network layer corresponding to the minimum equivalent bias value as the target network layer; or when there are N target network layers, determine the last network layer in the N target network layers as the target network layer.

11. The neural network batch normalization optimization method as claimed in claim 2, wherein the activation procession is performed using the following activation function:

$$\text{relu}(x) = \begin{cases} x \mid x \geq 0; \\ 0 \quad x < 0; \end{cases}$$

optimizing the above activation function, the optimized activation function is as follows:

relu(x+bias_eq)=relu_new(x)+bias_eq;

$$\text{relu\_new}(x) = \begin{cases} x & x \geq -\text{bias\_eq}; \\ -\text{bias\_eq}; & x < -\text{bias\_eq}; \end{cases}$$

wherein: x is an input value of the activation function of the different activation layers before being adjusted, bias_eq is equivalent biases of the different activation layers, and relu_new(x) is the modified activation function.

12. The neural network batch normalization optimization method as claimed in claim 4, wherein for a Batch Norm layer in the neural network, if a k-th layer is the Batch Norm layer and comprises a plurality of outputs, an i-th output of the k-th Batch Norm layer is expressed as follows:

$$\text{out}_k[i,:,:] = \frac{\text{data}_k[,:,:] - \text{data\_mean}_k[i]}{\sqrt{\text{data\_var}_k[i] + \varepsilon}} * \text{gamma}_k[i] + \text{beta}_k[i]; \quad (1)$$

$$\text{data\_mean}_k[i] = \text{mean}(\text{data}_k[i,:,:]);$$

$$\text{data\_var}_k[i] = \text{var}(\text{data}_k[i,:,:]);$$

wherein, $\text{data}_k[i,:,:]$ is input data of the k-th layer, $\text{gamma}_k[i]$ and $\text{beta}_k[i]$ are parameters of the i-th path of the k-th network layer obtained by training, $\text{data\_var}_k[i]$ is a variance of the i-th path of the k-th network layer obtained by training, $\text{data\_mean}_k[i]$ is a mean difference of the i-th path of the k-th network layer obtained by training, $\varepsilon$ is a constant;

continuing to perform expansion and merge procession on the formula (1) to obtain that an expression of the i-th output of the k-th network layer is simplified as follows:

$$\text{out}_k[i,:,:] = \frac{\text{gamma}_k[i]}{\sqrt{\text{data\_var}_k[i] + \varepsilon}} * \text{data}_k[,:,:] - \quad (2)$$

-continued $$\frac{\text{data\_mean}_k[i]}{\sqrt{\text{data\_var}_k[i] + \varepsilon}} * \text{gamma}_k[i] + \text{beta}_k[i]$$

$$= \text{weight}_k[i] * \text{data}_k[i, :, :] + \text{bias}_k[i];$$

$$\text{weight}_k[i] = \frac{\text{gamma}_k[i]}{\sqrt{\text{data\_var}_k[i] + \varepsilon}};$$

defining:

$$\text{bias}_k[i] = -\frac{\text{data\_mean}_k[i]}{\sqrt{\text{data\_var}_k[i] + \varepsilon}} * \text{gamma}_k[i] + \text{beta}_k[i];$$

wherein, $\text{weight}_k[i]$ represents a weight of the i-th path of the k-th network layer, $\text{bias}_k[i]$ represents the bias value of the i-th path of the k-th network layer before being merged.

* * * * *